(12) United States Patent
Ebejer et al.

(10) Patent No.: US 6,269,993 B1
(45) Date of Patent: Aug. 7, 2001

(54) SPRING CLIP

(76) Inventors: Dennis E. Ebejer, 836 Coiner Ct., Los Alamos, CA (US) 93440; Jacob Y. Wong, 7110 Georgetown Rd., Goleta, CA (US) 93117

( * ) Notice: Subject to any disclaimer, the term of this patent is extended or adjusted under 35 U.S.C. 154(b) by 0 days.

(21) Appl. No.: 09/307,416

(22) Filed: May 8, 1999

(51) Int. Cl.[7] .................................................. A45C 1/04
(52) U.S. Cl. ........................ 224/674; 224/269; 224/673
(58) Field of Search ................................... 224/674, 269, 224/673, 675, 672, 670, 671, 270, 271, 240, 247, 250; 24/3.12

(56) References Cited

U.S. PATENT DOCUMENTS

| | | | |
|---|---|---|---|
| 368,943 | * | 8/1887 | Gordon ............................ 224/247 X |
| 792,126 | * | 6/1905 | Freund ................................ 224/250 |
| 1,913,142 | * | 6/1933 | Ondricek ............................. 24/3.5 |
| 3,390,761 | * | 7/1968 | Jeanfavre ......................... 224/255 X |
| 5,248,072 | * | 9/1993 | Jones ................................. 224/247 |
| 5,341,975 | * | 8/1994 | Marinescu ....................... 224/269 X |
| 5,388,741 | * | 2/1995 | Hillinger ............................. 224/679 |
| 5,573,167 | * | 11/1996 | Bebb et al. ...................... 224/269 X |
| 5,788,132 | * | 8/1998 | Kuruc, Jr. ........................... 224/250 |
| 5,979,019 | * | 11/1999 | Johnson .......................... 224/269 X |

* cited by examiner

Primary Examiner—Gregory M. Vidovich
Assistant Examiner—Maerena W. Brevard
(74) Attorney, Agent, or Firm—James F. Cottone

(57) ABSTRACT

One end of a leaf spring is connected to a plate so that the leaf spring is disposed generally parallel to the plate, permitting the resulting article to be clipped onto an edge of a thin object, such as a waistband. Two spaced parallel slots extend through the plate, permitting a band of material, such as a belt, to be attached to the plate by threading the band into one of the slots and out of the other slot. The resulting article permits carrying cases that are provided with belt loops, intended for a user's belt, to be clipped onto the waistband of a beltless user.

7 Claims, 2 Drawing Sheets

SPRING CLIP

BACKGROUND OF THE INVENTION

Knives, tools, radios, cameras, flashlights, first-aid kits and eyeglasses are examples of items that frequently are carried in cases, sheaths, and holsters that are intended to be attached to a belt worn around a person's waist. The cases, sheaths and holsters are usually provided with a belt loop located on the side facing the user. The belt loops are oriented vertically, like the belt loops on a pair of pants, and sometimes the loops are provided with a snap fastener or a hook-and-loop fastener, so that the loop can be opened, passed around the belt, and then closed, thereby encircling the belt. This way of carrying the knives, tools, radios, etc., is convenient provided the user is wearing a belt.

However, if the user is wearing a beltless dress or gown, or bib overalls, coveralls, a bathing suit, or boxer shorts, or pants held up by suspenders, there normally is no belt to which the various cases can be attached. In this situation the usefulness of the clip of the present invention becomes appreciated.

The clip provides a secure connection intermediate the case or sheath and the clothing of the user. The belt loop of the case or sheath is engaged by the clip, and the clip fits over the edge of an article of clothing, gripping the article. For example, the clip may be clipped onto a waistband, a pocket, a neckband, or even the top of a boot.

THE PRIOR ART

In U.S. Pat. No. 4,757,927 issued Jul. 19, 1988 to Rutty, there is shown a holder for removably attaching a measuring rule or similar object to a user's belt. The object to be attached must have a spring clip, which engages a horizontal slot at the lower portion of the holder. In one embodiment the holder is attached to the user's belt by a spring clip that is part of the holder. In another embodiment, the holder includes two spaced parallel slots through which the end of the user's belt is threaded. In U.S. Pat. No. 1,588,630 issued Jun. 15, 1926 to Smith, there is shown a clasp that accomplishes a similar result.

In U.S. Pat. No. 5,025,587 issued Jun. 25, 1991 to Creed, there is shown an article that clips onto a belt and that includes a slot for retaining the knotted end of a rope.

In U.S. Pat. No. 2,264,957 issued Dec. 2, 1941 to Shafarman, there is shown a necktie hanger that includes two slots, but which does not include a leaf spring clip.

In U.S. Pat. No. 5,331,721 issued Jul. 26, 1995 to Raum, Sr. there is shown a U-shaped belt clip that includes a hook-and-loop fastener on one of its outer surfaces so that articles having that type of material affixed to them can be attached to the clip. The embodiment of FIG. 9 is, in effect, two clips having their spring elements extending in opposite directions.

In U.S. Pat. No. 5,103,884 issued Apr. 14, 1992 to Roman, there is shown a belt clip that permits a wallet to be secured to the user's belt.

Although many types of clips are known from the prior art, none of them, so far as can be determined, has the unique structure of the clip of the present invention.

SUMMARY OF THE INVENTION

The present invention is a leaf spring clip that is adapted to be removably attached to a band of flexible material such as a belt.

In all of its embodiments, the present invention includes a plate that has two spaced parallel slots that extend completely through it. The band of flexible material is threaded through these slots, thereby retaining the plate on the band. The plate is connected to one end of a leaf spring which is disposed generally parallel to the plate. Through the use of the present invention an article may be connected to the band or belt by inserting the article, or part of it, between the leaf spring and the plate. As the article is inserted between the leaf spring and the plate, the leaf spring is elastically deformed away from the plate, and this sets up elastic restoring forces in the leaf spring that cause the leaf spring to push the article against the plate. The elastic restoring forces are substantially perpendicular to the leaf spring and to the plate. Withdrawal of the article is opposed by the resulting frictional forces between the article and the leaf spring and between the article and the plate.

In some embodiments of the invention, the parallel slots in the plate do not extend to an edge of the plate; but in other embodiments the parallel slots are extended to an edge of the plate by means of extension slots that need not be parallel. In the former case, the band of material must be threaded endways into one of the slots and then back out through the other slot. In the latter case, the band of material, to which the plate is to be attached, can be inserted sideways into the slots that extend to the edge of the plate.

In a preferred embodiment of the invention, the leaf spring is a reverted portion of the plate. That is, a tongue of the plate is bent back over the plate to become the leaf spring. In an alternative embodiment, one end of the leaf spring is attached to the plate by a fastener. In a variation of this embodiment, the fastener permits the leaf spring to be rotated with respect to the plate about an axis that is perpendicular to the plate.

In the preferred embodiment, the leaf spring extends in a direction perpendicular to the slots of the plate, but in alternative embodiments, the leaf spring extends parallel to the slots.

In the preferred embodiment, the plate further includes a hole large enough to permit a rope to be passed through it, but small enough to prevent passage of a knot tied in the end of the rope, and in this way a rope may be secured to the plate.

Although the clip was originally conceived of as engaging a vertically-oriented belt loop on the back of a case or sheath, it soon became clear that the clip is indifferent to the length of the belt loop and whether or not the belt loop is open or closed. Not limited to engaging a belt loop, the clip can instead engage a band that encircles and retains almost any object, even if the object has no belt loop.

As originally conceived, the band forming the belt loop on the item to be attached extended vertically and the spring clip portion of the clip also extended vertically, based on the assumption that the clip would preferably be attached to a horizontal edge, such as a waistband. While this assumption remains valid, it was recognized that the band corresponding to the belt loop might, in some applications, advantageously extend horizontally instead of vertically. This was the origin of an alternative embodiment.

From there it was only a short step to another alternative embodiment in which the spring clip portion is pivotally attached to the belt-loop-engaging plate portion of the clip.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
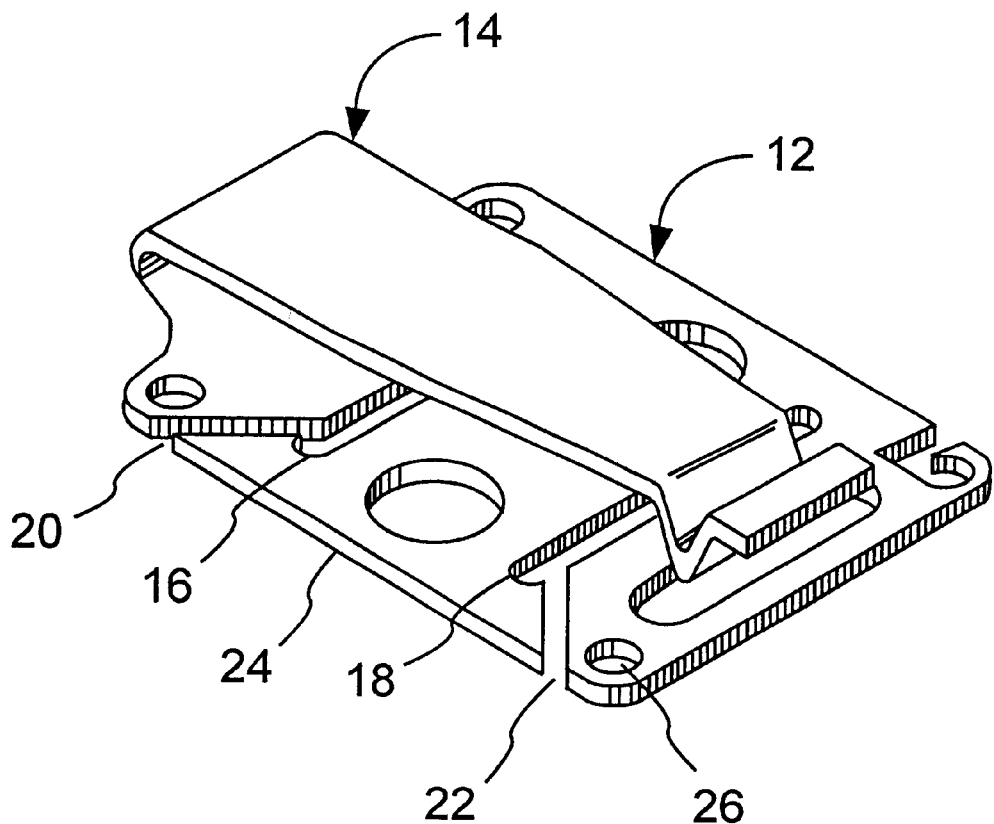
FIG. 1 is a perspective view showing a preferred embodiment of the clip of the present invention.

As seen in the perspective view of FIG. 1, the clip of the present invention includes two major portions: a plate 12 and a leaf spring 14. As used here, a leaf spring is a resilient member having a first end, or root end, connected to the plate 12 and having a free second end that can be flexed in a direction perpendicular to the plate 12. A piece of wire bent into a U-shape and attached at its ends to the plate would be included under this definition. In the preferred embodiment of FIG. 1, the leaf spring is a broad thin beam connected at one end to the plate 12.

In the preferred embodiment of FIG. 1, the clip is a one-piece article formed from sheet metal stock. The process of manufacture includes the steps of stamping the clip from sheet stock and bending the leaf spring 14 back over the plate 12.

Figure 2:
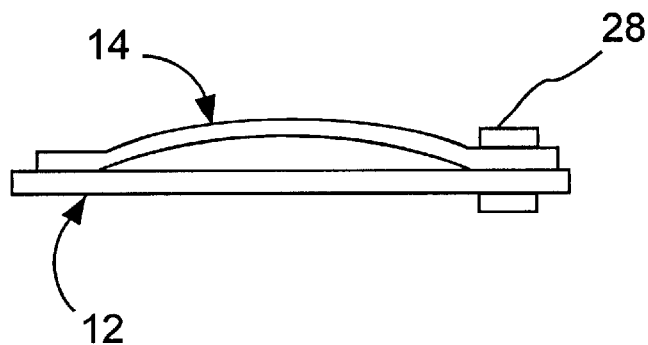
FIG. 2 is a side elevational view of a first alternative embodiment of the clip, in which the leaf spring is attached to the plate by a fastener.

FIG. 2 shows a first alternative embodiment of the clip which differs from the preferred embodiment of FIG. 1 in that the leaf spring 14 is connected to the plate 12 by means of a fastener 28, a rivet. This permits the material of the leaf spring 14 to be different in composition and in thickness from the material used for the plate 12.

Figure 3:
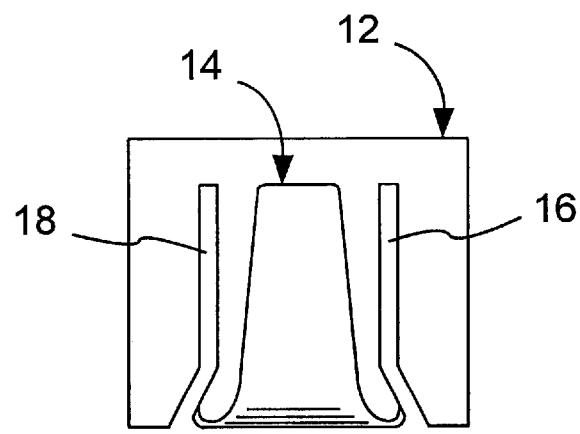
FIG. 3 is a top plan view of a second alternative embodiment of the clip, in which the leaf spring extends parallel to the slots in the plate.

FIG. 3 shows a second alternative embodiment of the clip, in which the leaf spring 14 extends in the same direction as the parallel slots 16 and 18. In this embodiment, the leaf spring may serve as a hook from which a rope or drawstring may be suspended.

Figure 4:
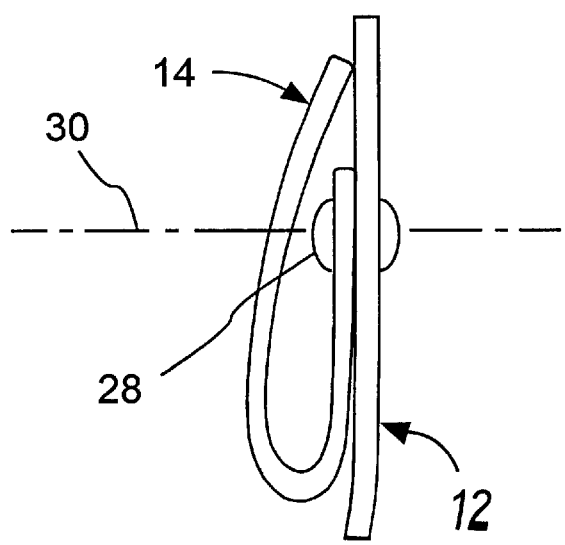
FIG. 4 is a side elevational view of a third alternative embodiment of the clip, in which the leaf spring is attached to the plate for rotation with respect to the plate.

FIG. 4 shows a third alternative embodiment of the clip. In this embodiment, the leaf spring 14 is attached to the plate 12 by a fastener 28 that permits the leaf spring to rotate about an axis 30 that is perpendicular to the plate. In this embodiment, the leaf spring can be oriented perpendicular to the parallel slots or parallel to them as the user chooses.

The parallel slots 16 and 18 are present in all embodiments, but in some embodiments the extension slots 20 and 22 are omitted. If maximum security is desired, the extension slots 20 and 22 are omitted and the end of the band of material must be threaded into one of the parallel slots and out of the other. On the other hand, if the band of material is a closed loop having no end, then it is more convenient to provide the extension slots 20 and 22 which permit the band of material to be inserted sideways into the slots.

If an object to be carried already has a belt loop affixed to it, the belt loop may be inserted into the slots of the plate 12, and the leaf spring 14 may be used for clipping the item onto the edge of an article of clothing, such as a waistband or a neckband.

In conclusion, the present invention may be viewed alternatively as:
  a) a spring clip that is adapted, by means of the slots 16 and 18 in the plate, to be removably attached to a band of material, for example a belt;
or
  b) an article for retaining a band of material, that is adapted by means of the leaf spring 14 to be clipped onto the edge of a thin object, for example a waistband.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A clip comprising:
  a one-piece article including a substantially planar base portion having at least two spaced parallel linear slots extending in a first direction;
  a leaf spring portion generally parallel to and spaced from said base portion, facing the slots, having a root end that melds into said base portion, having a free end opposite the root end, and extending from the root end to the free end in a direction perpendicular to the first direction;
  wherein each of said two slots includes a linear edge, and further comprising extension slots extending from the linear edge of each slot to the periphery of said base portion.

2. The clip of claim 1 wherein said extension slots are linear and are oriented at an angle with respect to said first direction.

3. The clip of claim 1 wherein said base portion further comprises a circular hole.

4. A clip comprising:
  a one-piece article including a substantially planar base portion having at least two spaced parallel linear slots extending in a first direction, whereby an end of a band may be passed into one of the slots and out of the other slot;
  a leaf spring portion generally parallel to and spaced from said base portion, whereby an edge of a sheet of material may be grasped between said leaf spring portion and said base portion, said leaf spring portion facing the slots, having a root end that melds into said base portion, having a free end opposite the root end, and extending from the root end to the free end in a direction perpendicular to the first direction;
  each of said two slots including a linear edge, and further comprising extension slots extending from the linear edge of each slot to the periphery of said base portion, whereby the clip may be slid onto a closed-loop band with the band passing into one of the slots and out of the other slot.

5. The clip of claim 4 wherein said extension slots are linear and are oriented at an angle with respect to the first direction, whereby the disposition of said extension slots prevents the clip from accidentally falling off the band.

6. The clip of claim 4 wherein the root of said leaf spring portion melds into said base portion at the periphery of said base portion, whereby said leaf spring portion is a reverted portion of said clip.

7. The clip of claim 4 wherein said base portion further comprises a circular hole whereby a knotted rope may be secured to said base portion.

* * * * *